(12) United States Patent  
Song et al.

(10) Patent No.: US 11,000,770 B2  
(45) Date of Patent: May 11, 2021

(54) METHOD AND SYSTEM FOR EXPANDING PLACEMENT SPACE OF UNIT IN GAME

(71) Applicant: LINE Up Corporation, Seongnam-si (KR)

(72) Inventors: Jisun Song, Seongnam-si (KR); Woo Duck Seo, Seongnam-si (KR)

(73) Assignee: LINE UP CORPORATION, Gyeonggi-do (KR)

( * ) Notice: Subject to any disclaimer, the term of this patent is extended or adjusted under 35 U.S.C. 154(b) by 0 days.

(21) Appl. No.: 16/212,115

(22) Filed: Dec. 6, 2018

(65) Prior Publication Data

US 2019/0299107 A1 Oct. 3, 2019

(30) Foreign Application Priority Data

Mar. 28, 2018 (KR) .................. 10-2018-0035839

(51) Int. Cl.
*A63F 13/822* (2014.01)
*A63F 13/85* (2014.01)
*A63F 13/55* (2014.01)

(52) U.S. Cl.
CPC ............ *A63F 13/822* (2014.09); *A63F 13/55* (2014.09); *A63F 13/85* (2014.09)

(58) Field of Classification Search
CPC ........ A63F 13/822; A63F 13/85; A63F 13/55; A63F 13/69; A63F 13/70
See application file for complete search history.

(56) References Cited

FOREIGN PATENT DOCUMENTS

KR   10-2008-0044395 A   5/2008

OTHER PUBLICATIONS

"StarCraft," 1998, Blizzard Entertainment, instruction manual (Year: 1998).*
_ForgeUser22733356, "Enabel structure placement grid," 2016, SCIIMapster, https://www.sc2mapster.com/forums/development/melee-development/165629-enabel-structure-placement-grid (Year: 2016).*
Donpost, "Achievement: 200 resources per turn," Jun. 16, 2008, Civfanatics, https://forums.civfanatics.com/threads/achievement-200-resources-per-turn.279082/ (Year: 2008).*
Factorio Wiki, "Beacon," Dec. 21, 2017, https://web.archive.org/web/20171221033703/https://wiki.factorio.com/Beacon (Year: 2017).*

* cited by examiner

*Primary Examiner* — Kevin Y Kim
(74) *Attorney, Agent, or Firm* — Harness, Dickey & Pierce, P.L.C.

(57) ABSTRACT

Provided are a method and a system for expanding a unit placement space in a game. A unit placement space expanding method may provide a user with a function capable of arbitrarily expanding a limited space in which units are placeable in a game using resources provided from the game, and may allow users to place a unit through a secured space only when a unit placement space is secured in advance. Accordingly the users may expand a space by strategically placing units and entertain strategic advantages during the game.

18 Claims, 13 Drawing Sheets

FIG. 10

| | 1 | 1 | 1 | 2 | 2 | 2 | 3 | 3 | 4 | 4 | 4 | 4 | 3 | 3 | 2 | 2 | 2 | 1 | 1 | 1 | |
|---|---|---|---|---|---|---|---|---|---|---|---|---|---|---|---|---|---|---|---|---|---|
| H Q | 0 | 0 | 1 | 1 | 2 | 2 | 2 | 3 | 3 | 4 | 4 | 3 | 3 | 2 | 2 | 2 | 1 | 1 | 0 | 0 | H Q |
| | 0 | 0 | 1 | 1 | 2 | 2 | 2 | 3 | 3 | 4 | 4 | 3 | 3 | 2 | 2 | 2 | 1 | 1 | 0 | 0 | |
| | 0 | 0 | 1 | 1 | 2 | 2 | 2 | 3 | 3 | 4 | 4 | 3 | 3 | 2 | 2 | 2 | 1 | 1 | 0 | 0 | |
| | 1 | 1 | 1 | 2 | 2 | 2 | 3 | 3 | 4 | 4 | 4 | 4 | 3 | 3 | 2 | 2 | 2 | 1 | 1 | 1 | |

1010 (top), 1020 (left), 1030 (right)

METHOD AND SYSTEM FOR EXPANDING PLACEMENT SPACE OF UNIT IN GAME

CROSS-REFERENCE TO RELATED APPLICATION(S)

This U.S. non-provisional application claims the benefit of priority under 35 U.S.C. § 119 to Korean Patent Application No. 10-2018-0035839 filed on Mar. 28, 2018, in the Korean Intellectual Property Office (KIPO), the entire contents of which are incorporated herein by reference.

BACKGROUND

Field

One or more example embodiments relate to methods and/or systems for expanding a unit placement space in a game. More particularly, one or more example embodiments relate to (1) unit placement space expanding methods that provide a user with a function capable of arbitrarily expanding a limited space in which units are placed in a game using resources provided from the game and allow users to place a unit through a secured space only when a unit placement space is secured in advance, (2) computer apparatuses for performing the unit placement space expanding method, and (3) non-transitory computer-readable recording media storing instructions that, when executed by a processor, cause the processor to perform the unit placement space expanding method. According to the one or more example embodiments, the users may be able to expand a space by strategically placing units, and may entertain strategic advantages during the game.

Description of Related Art

A strategic game refers to a game of a genre in which game players use their operational ability and strategic decision-making skills in determining the outcome.

In such conventional strategic games, a space for placing units is limited using various conditions and based on a genre or a characteristic of a game. For example, in a game such as janggi (Korean chess) or chess, initial placement of many units is preset, and thus is limited. As another example, in a games such as a general defense game, a location at which a unit selected by a user initially appears during a game is determined in advance.

SUMMARY

One or more example embodiments provide a unit placement space expanding method, a computer apparatus for performing the unit placement space expanding method, and a non-transitory computer-readable recording medium storing instructions that, when executed by a processor, cause the processor to perform the unit placement space expanding method. The unit placement space expanding method may provide a user with a function capable of arbitrarily expanding a limited space in which units are placeable in a game using resources provided from the game, and may allow users to place a unit through a secured space only when a unit placement space is secured in advance. Accordingly, the users may expand a space by strategically placing units and entertain strategic advantages during the game According to an aspect of at least one example embodiment, a method of expanding a unit placement space includes allocating at least one of a plurality of unit spaces constituting a field of a game instance to a user as the unit placement space in response to initiating the game instance in a game, providing the user with a space expansion function of expanding the unit placement space by purchasing a unit space using resources allocated to the user in the game or in the game instance during a progress of the game instance, and proceeding with the game instance (i) based on a unit of the user included in the unit placement space, and (ii) in response to expanding the unit placement space using the space expansion function, based on a unit of the user included in the expanded unit placement space.

A unit space purchasable through the spacer expansion function may be limited to a unit space adjacent to the unit placement space allocated to the user.

The field may be divided into the plurality of unit spaces by a plurality of cells in a grid shape, and the unit placement space expanding method may further include graphically displaying the plurality of cells in the grid shape on the field in response to the user activating the space expansion function, purchasing, using the resources, a unit space corresponding to a cell, from among the plurality of cells adjacent to the unit placement space allocated to the user, and expanding the unit placement space by adding the purchased unit space to the unit placement space.

The unit placement space expanding method may further include providing the user with a unit purchase function of purchasing a unit using the resources, in the game instance, and placing a unit purchased through the unit purchase function on a unit space selected by the user from among the plurality of unit spaces included in the unit placement space or the expanded unit placement space.

The unit placement space expanding method may further include setting an amount of the resources for purchase to be different with respect to each of at least two of the plurality of unit spaces.

The unit placement space expanding method may further include setting an amount of the resources to purchase each of the plurality of unit spaces based on a distance from a headquarter allocated to the user or a distance from the unit placement space in the game instance.

The unit placement space expanding method may further include setting an item for applying an effect to the game instance to at least one of the plurality of unit spaces, and applying the effect corresponding to the item to the at least one of the plurality of unit spaces to which the item is set, to the unit of the user, or to a unit of a counterpart of the user, in the game instance, in response to the item being set to the unit space purchased through the space expansion function.

The setting an item may include changing a level of the effect corresponding to the item based on (i) a distance between the unit space to which the item is set and a headquarter allocated to the user in the game instance or (ii) a distance between the unit space to which the item is set and the unit placement space.

The setting an item may include dynamically changing at least one of a type of the item, a number of items, or a location at which the item is placed based on an intermediate result according to the progress of the game instance.

The proceeding may include proceeding with the game instance based on a plurality of turns, and providing an amount of the resources for each unit space included in the unit placement space allocated to the user per new turn.

According to an aspect of at least one example embodiment, there is provided a non-transitory computer-readable recording medium storing instructions that, when executed by a processor, cause the processor to perform the aforementioned unit placement space expanding method.

According to an aspect of at least one example embodiment, a computer apparatus may include at least one processor configured to execute computer-readable instructions. The at least one processor may be configured to allocate at least one of a plurality of unit spaces constituting a field of a game instance to a user as the unit placement space in response to initiating the game instance in a game, provide the user with a space expansion function of expanding the unit placement space by purchasing a unit space using resources allocated to the user in the game or in the game instance during a progress of the game instance, and proceed with the game instance (i) based on a unit of the user included in the unit placement space, and (ii) in response to expanding the unit placement space using the space expansion function, based on a unit of the user included in the expanded unit placement space.

According to some example embodiments, it is possible to provide a user with a function capable of arbitrarily expanding a limited space in which units are placeable in a game using resources provided from the game, and allow users to place a unit through a secured space only when a unit placement space is secured in advance. Accordingly, the users may expand a space by strategically placing units and entertain a strategic advantages during the game.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein:

FIG. 10 illustrates an example of unit spaces to which different prices are set according to at least one example embodiment;

Figure 1:
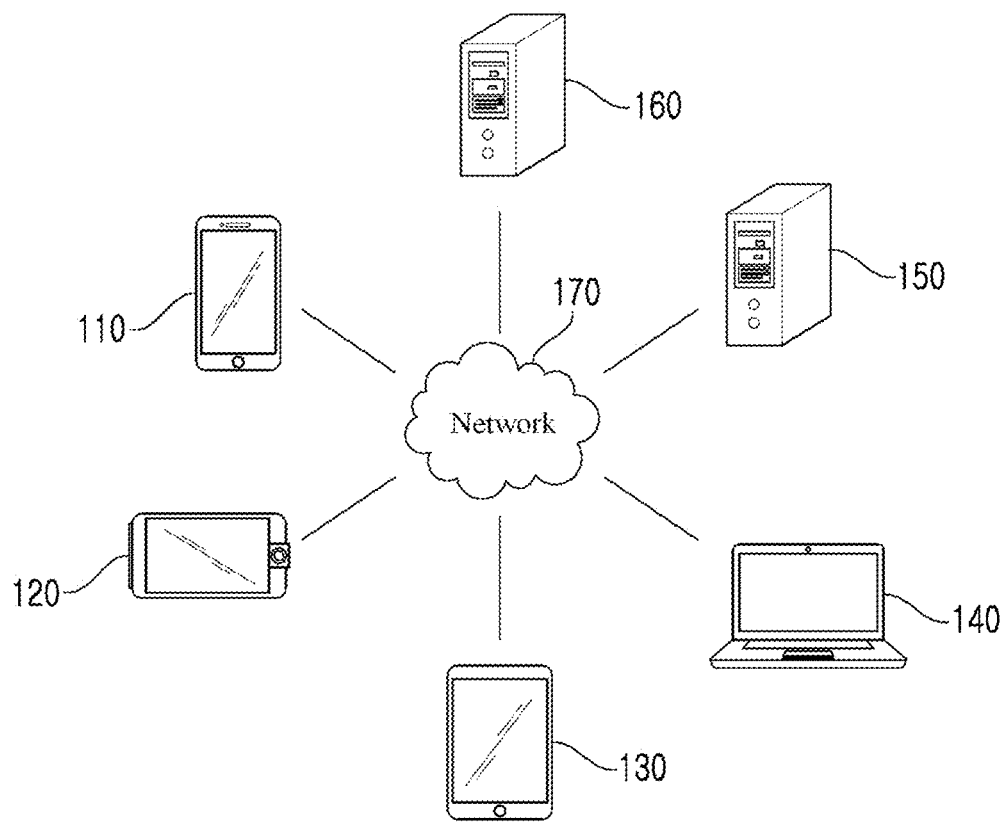
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference numerals denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, or a microprocessor), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device, however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

A unit placement space expanding method according to example embodiments may be performed by a computer apparatus, such as an electronic device or a server, which is described below. Here, a computer program according to an example embodiment may be installed and executed on the computer apparatus. The computer apparatus may perform the unit placement space expanding method under control of the executed computer program. The computer program may be stored in a non-transitory computer-readable recording medium to implement the unit placement space expanding method on a computer in conjunction with the computer apparatus.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example. A number of electronic devices and/or a number of servers according to example embodiments of the present inventive concepts are not limited thereto.

Each of the plurality of electronic devices 110, 120, 130, and 140 may be a fixed terminal or a mobile terminal configured as a computer device. For example, the plurality of electronic devices 110, 120, 130, and 140 may be a smartphone, a mobile phone, a navigation, a computer, a laptop computer, a digital broadcasting terminal, a personal digital assistant (PDA), a portable multimedia player (PMP), a tablet personal computer (PC), a game console, a wearable device, an Internet of things (IoT) device, a virtual reality (VR) device, or an augmented reality (AR) device. Although FIG. 1 illustrates the electronic device 110 as a smartphone, example embodiments of the present inventive concepts are not limited thereto. The electronic device 110 may refer to any type of various physical computer devices capable of communicating with other electronic devices 120, 130, and/or 140, and/or the servers 150 and/or 160 over the network 170 in a wired communication manner or in a wireless communication manner.

The communication scheme is not particularly limited and may include a communication method that uses a near field communication between devices as well as a communication method using a communication network (e.g., a mobile communication network, the wired Internet, the wireless Internet, or a broadcasting network), which may be included in the network 170. For example, the network 170 may include at least one of network topologies (e.g., a personal area network (PAN), a local area network (LAN), a campus area network (CAN), a metropolitan area network (MAN), a wide area network (WAN), a broadband network (BBN), or the Internet) that include networks. The network 170 may include at least one of network topologies that include, for example, a bus network, a star network, a ring network, a mesh network, a star-bus network, and/or a tree or hierarchical network. However, example embodiments of the present inventive concepts are not limited thereto.

Each of the servers 150 and 160 may be configured as a computer apparatus or a plurality of computer apparatuses that provides instructions, codes, files, contents, services, and the like through communication with the plurality of electronic devices 110, 120, 130, and/or 140 over the network 170. For example, the server 150 may be a system that provides a service, for example, a game service, a social network service (SNS), a messaging service, a search service, a mail service, and a content providing service, to the plurality of electronic devices 110, 120, 130, and/or 140 connected over the network 170.

Figure 2:
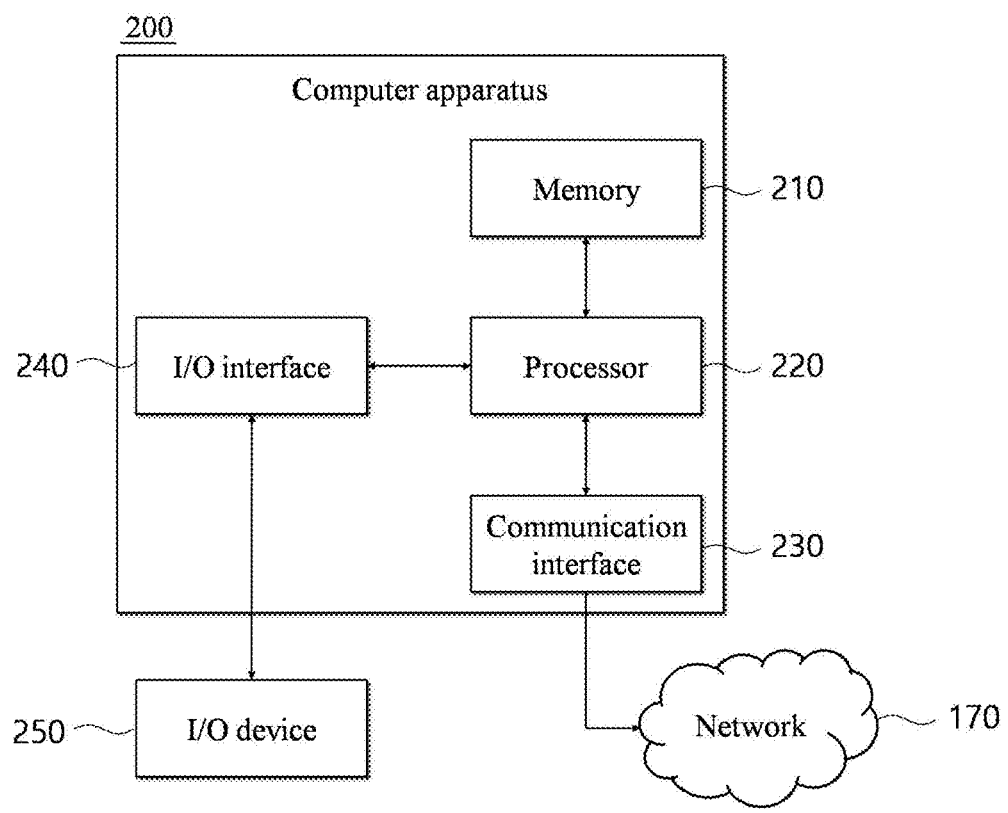
FIG. 2 is a block diagram illustrating an example of a computer apparatus according to at least one example embodiment.

FIG. 2 is a block diagram illustrating an example of a computer apparatus according to at least one example embodiment. Each of the electronic devices 110, 120, 130, and/or 140, or the servers 150 and/or 160 may be implemented by a computer apparatus 200 of FIG. 2.

Referring to FIG. 2, the computer apparatus 200 may include a memory 210, a processor 220, a communication interface 230, and an input/output (I/O) interface 240. The memory 210 may include a permanent mass storage device (e.g., random access memory (RAM), read only memory (ROM), or a disk drive) as a non-transitory computer-readable storage medium. Here, the permanent mass storage device (e.g., ROM or disk drive) may be included in the computer apparatus 200 as a permanent storage device separate from the memory 210. Also, an OS or at least one program code may be stored in the memory 210. Such software components may be loaded from another non-transitory computer-readable storage medium separate from the memory 210 to the memory 210. The other non-transitory computer-readable storage medium may include, for example, a floppy drive, a disk, a tape, a DVD/CD-ROM drive, or a memory card. According to other example embodiments, software components may be loaded to the memory 210 through the communication interface 230, instead of, or in addition to, the non-transitory computer-readable storage medium. For example, software components may be loaded to the memory 210 of the computer apparatus 200 based on a computer program installed by files provided over the network 170.

The processor 220 may be configured to process computer-readable instructions of a computer program by performing basic arithmetic operations, logic operations, and I/O operations. The computer-readable instructions may be provided from the memory 210 and/or the communication interface 230 to the processor 220. For example, the processor 220 may be configured to execute received instructions in response to the program code stored in the storage device (e.g., the memory 210).

The communication interface 230 may provide a function for communication between the computer apparatus 220 and the other apparatus, for example, the aforementioned storage devices over the network 170. For example, the processor 220 of the computer apparatus 200 may transfer a request created based on a program code stored in the storage device such as the memory 210, or an instruction, data, a file, etc., to the other apparatuses over the network 170 under control of the communication interface 230. Inversely, a signal, an instruction, content, a file, etc., from the other apparatus may be received at the computer apparatus 200 through the communication interface 230 of the computer apparatus 200 by going through the network 170. For example, a signal, an instruction, data, etc., received through the communication interface 230 may be transferred to the processor 220 or the memory 210, and data, a file, etc., may be stored in a storage medium (e.g., a permanent storage device), which may be further included in the computer apparatus 200.

The I/O interface 240 may be a device used for interface with an I/O device 250. For example, an input device may include a device such as a keyboard, a mouse, a microphone, or a camera, and an output device may include a device such as a display or a speaker. As another example, the I/O interface 240 may be a device for interface (e.g., a touchscreen) in which an input function and an output function are integrated into a single function. The I/O device 250 may be configured as a single device with the computer apparatus 200.

According to other example embodiments, the computer apparatus 200 may include a greater or lesser number of components than a number of components shown in FIG. 2. For example, the computer apparatus 200 may include at least a portion of the I/O device 250, or may further include other components (e.g., a transceiver and/or a database) .However, such additional components are well-known in the art, and thus are not explained in detail in this disclosure.

Figure 3:
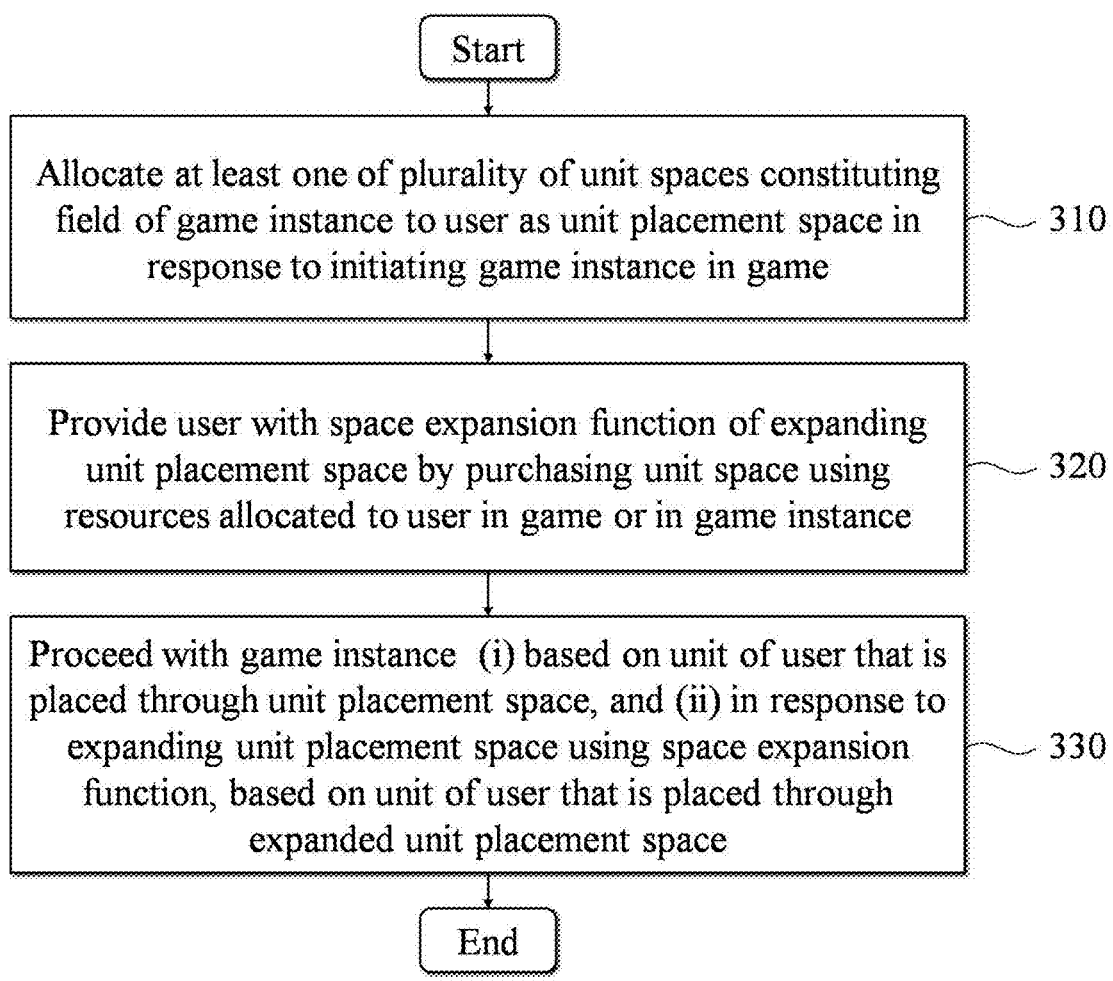
FIG. 3 is a flowchart illustrating a unit placement space expanding method according to at least one example embodiment.

FIG. 3 illustrates an example of a unit placement space expanding method according to at least one example embodiment. The unit placement space expanding method illustrated in FIG. 3 may be performed, for example, by the computer apparatus 200 of FIG. 2. For example, the processor 220 of the computer apparatus 200 may be configured to execute a control instruction according to a code of at least one program or a code of the OS included in the memory 210. Here, the processor 220 may control the computer apparatus 200 to perform operations 310 through 330 included in the unit placement space expanding method of FIG. 3 under a control instruction provided from the code stored in the computer apparatus 200.

Referring to FIG. 3, in operation 310, the computer apparatus 200 may allocate at least one of a plurality of unit spaces constituting a field of a game instance to a user as a unit placement space in response to initiating the game instance in a game. For example, the field may be divided into a plurality of unit spaces by a plurality of cells in a grid shape. For example, the field may be divided into 100 unit spaces by 100 cells in a grid shape including 5 rows and 20 columns. Here, at least one unit space among the 100 unit spaces may be allocated to the user as the unit placement space. The unit placement space may be a space in which the user may place a unit (alternatively, referred to as "game unit") for progress of the game instance.

In operation 320, the computer apparatus 200 may provide the user with a space expansion function of expanding the unit placement space by purchasing a unit space using resources allocated to the user in the game or in the game instance during a progress of the game instance. That is, the user may expand the unit placement space of the user within resources allocated to the user using the provided space expansion function. In some example embodiments, the user may need to place a unit within the unit placement space allocated to the user, or to purchase a corresponding unit space using the space expansion function and place the unit in the corresponding unit space that was not initially allocated to the user. Depending on example embodiments, a unit space purchasable through the space expansion function may be limited to a unit space adjacent to the unit placement space allocated to the user. For example, the computer apparatus 200 may limit a number of attempts that the user purchases a unit space separate from the unit placement space through the space expansion function.

For example, the computer apparatus 200 may display a button for activating the aforementioned space expansion function on a game screen for the user. In response to the user selecting the button, for example, in response to the user touching an area on which the button is displayed using a finger, a user interface that enables the user to select a unit space may be displayed, and the unit space selected by the user through the provided user interface may be added to the unit placement space of the user. If a purchasable unit space is limited to a unit space adjacent to the unit placement space currently allocated to the user, the user interface may be configured so that the user may select only a unit space adjacent to the unit placement space.

In operation 330, the computer apparatus 200 may proceed with the game instance based on a unit of the user that is placed through the unit placement space. Further, in response to expanding the unit placement space using the space expansion function, the computer apparatus 200 may proceed with the game instance based on a unit of the user that is placed through the expanded unit placement space. For example, the user may purchase a unit space through the space expansion function and may expand the unit placement space of the user within resources allocated to the user during the progress of the game instance. For example, a turn-based game in which an action executable within a single turn is limited by resources may be considered. For example, the user may purchase and place a unit using a corresponding resource through the unit placement space that is initially allocated to the user. In some example embodiments, the user may purchase and place a unit using a portion of resources, and may place a unit purchased with the remaining resources on the expanded unit placement space. Here, an amount of resources may be set per unit space corresponding to the unit placement space, and the set amount of resources may be provided to the user per new turn. That is, resources may be used to expand the unit placement space, and an amount of resources available per turn may increase according to an expansion of the unit placement space.

Figure 4:
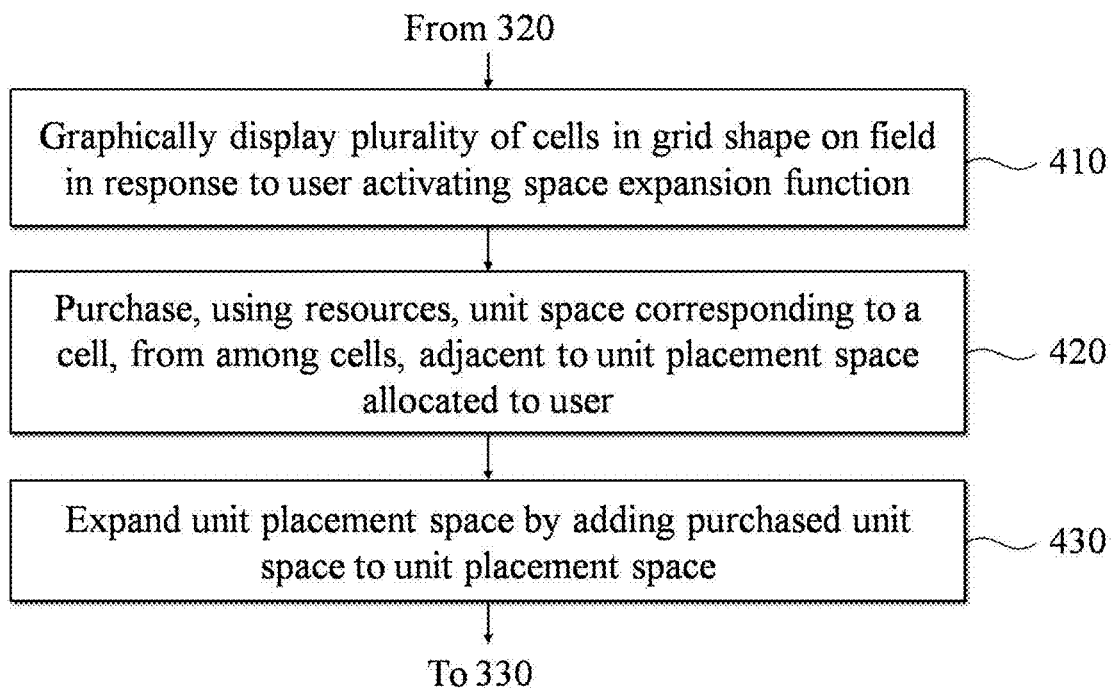
FIG. 4 is a flowchart illustrating an example of expanding a unit placement space through a space expansion function according to at least one example embodiment.

FIG. 4 is a flowchart illustrating an example of expanding a unit placement space through a space expansion function according to at least one example embodiment. Operations 410 through 430 of FIG. 4 may be performed by the computer apparatus 200 between operations 320 and 330 of FIG. 3. The example embodiment of FIG. 4 is based on an example in which a field of a game instance is divided into a plurality of unit spaces by a plurality of cells in a grid shape.

Referring to FIG. 4, in operation 410, the computer apparatus 200 may graphically display the plurality of cells in the grid shape on the field in response to the user activating the space expansion function. That is, the computer apparatus 200 may divide the field and may graphically display virtual unit spaces constituting the field on a screen so that each user may easily purchase a desired unit space.

In operation 420, the computer apparatus 200 may purchase, through the resources, a unit space corresponding to a cell, from among the plurality of cells, adjacent to the unit placement space allocated to the user. For example, the user may touch a cell the user desires to expand using a finger in a touchscreen environment, and the computer apparatus 200 may recognize the cell selected by the user based on a location at which the touch occurs. Here, the computer apparatus 200 may recognize the unit space corresponding to the recognized cell as the unit placement space of the user, and may process purchase of the corresponding unit space by reducing an amount of resources corresponding to the selected unit space from a total amount of resources allocated to the user.

In operation 430, the computer apparatus 200 may expand the unit placement space by adding the purchased unit space to the unit placement space. That is, the computer apparatus 200 may expand the unit placement space by updating the unit placement space by adding a newly purchased unit space to the existing unit placement space, which includes at least one unit space.

Figure 5:
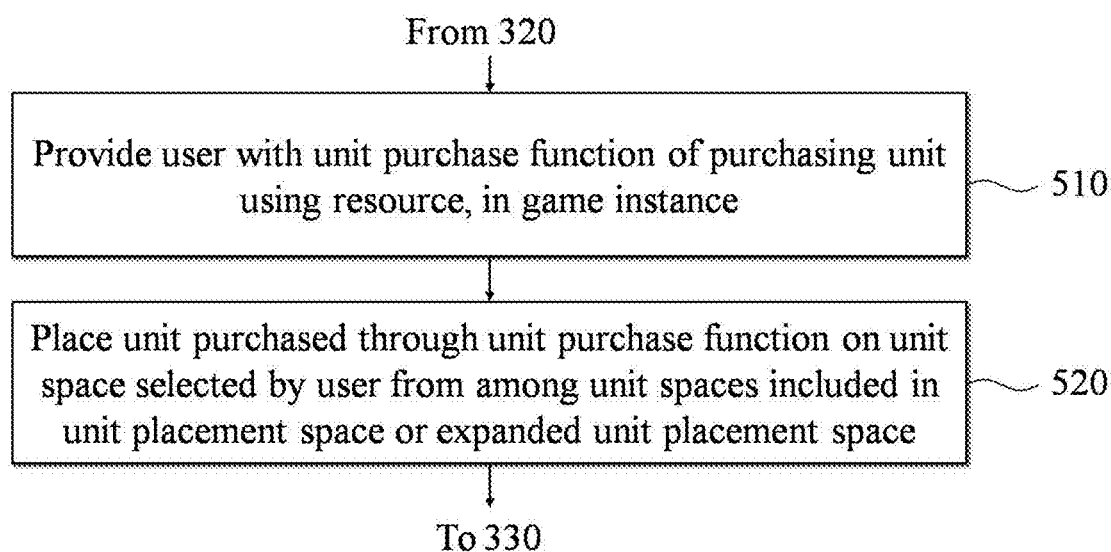
FIG. 5 is a flowchart illustrating an example of a unit purchase process according to at least one example embodiment.

FIG. 5 is a flowchart illustrating an example of a unit purchase process according to at least one example embodiment. Operations 510 and 520 of FIG. 5 may be performed by the computer apparatus 200 between operations 320 and 330 of FIG. 3.

Referring to FIG. 5, in operation 510, the computer apparatus 200 may provide the user with a unit purchase function of purchasing a unit using the resources, and place the purchased unit on a unit space selected by the user from among unit spaces included in the unit placement space or the expanded unit placement space, in the game instance. For example, a plurality of buttons for the unit purchase function may be displayed for the user on a game screen. Here, each of the plurality of buttons may correspond to a specific unit. In response to the selecting a specific button, a unit corresponding thereto may be purchased, and an amount of resources set for the unit may be reduced from a total amount of resources allocated to the user.

In operation 520, the computer apparatus 200 may place a unit purchased through the unit purchase function on a unit space selected by the user from among unit spaces included in the unit placement space or the expanded unit placement space. In the case of the aforementioned turn-based game, the user may place a purchased unit on a specific unit space of the unit placement space in such a manner that the user may expand the unit placement space and/or purchase the unit every turn. Here, a counterpart (opponent), for example, another user or an artificial intelligence, of the user may also place a purchased unit on the unit placement space by expanding the unit placement space of the counterpart and/or by purchasing the unit in the same or substantially similar manner as described above. A combat between units may be automatically performed by the artificial intelligence. Here, operation 330 may be performed every turn, and operation 520 may be selectively performed in response to a request of the user at a user controllable point in time between turns.

Such turn-based game is provided as an example only. Example embodiments may be applicable to various types of games.

Figure 6:
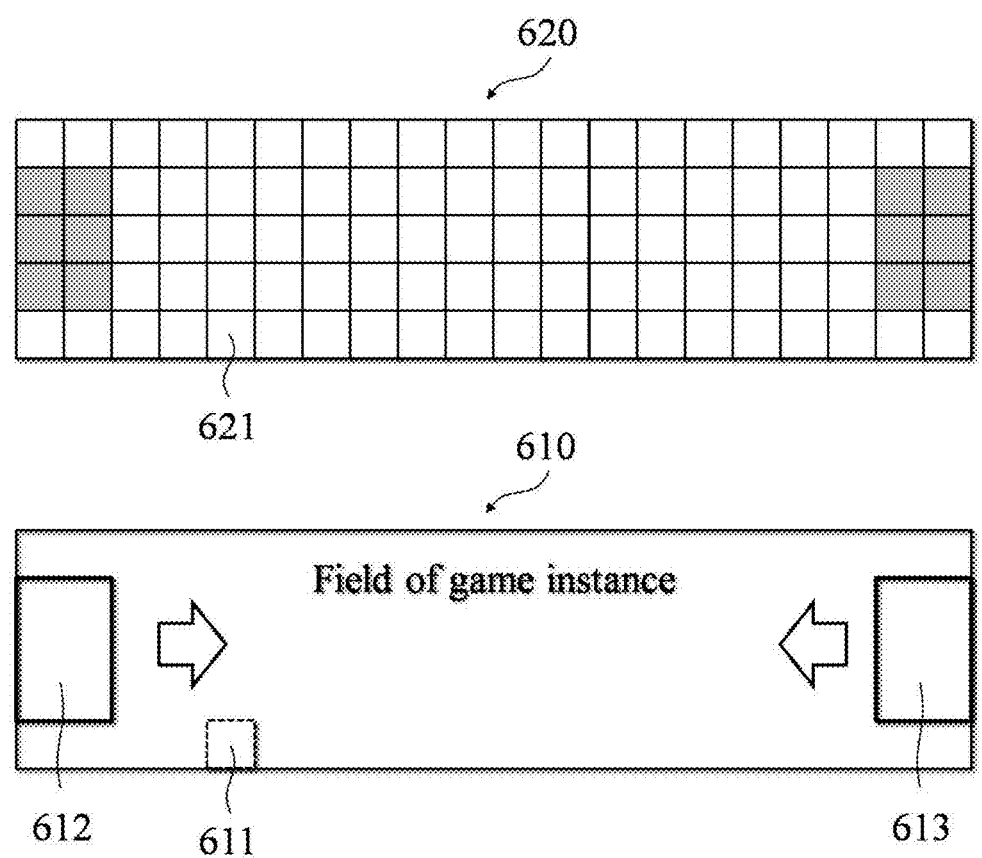
FIG. 6 illustrates an example of a unit space constituting a field of a game instance and a unit placement space according to at least one example embodiment.

FIG. 6 illustrates an example of a unit space constituting a field of a game instance and a unit placement space according to at least one example embodiment. An example embodiment in which a field 610 of a game instance is divided into 100 unit cells in a grid shape 620 with a size of 5×20 will be described with reference to FIG. 6. For example, the field 610 of the game instance may be a portion of a game screen and the grid shape 620 may include virtual lines for dividing the field 610 of the game instance into 100 unit spaces. For example, in the grid shape 620, a cell 621 corresponding to (5, 5) may be used to identify a unit space 611 of a corresponding location. Here, it can be known that unit spaces of the field 610 of the game instance corresponding to six cells of (2, 1), (2, 2), (3, 1), (3, 2), (4, 1), and (4, 2) in the grid shape 620 form a unit placement space 612 initially allocated to a first user. In the grid shape 620, a space corresponding to six cells of (2, 19), (2, 20), (3, 19), (3, 20), (4, 19), and (4, 20) form a unit placement space 613 initially allocated to a second user. Here, the second user refers to a counterpart (e.g., an opponent) of the first user. Each of users may place a unit purchased using the aforementioned unit purchase function on one of unit spaces included in a unit placement space of a corresponding user. A combat may automatically proceed as placed units move toward camps of mutual opponents.

Figure 7:
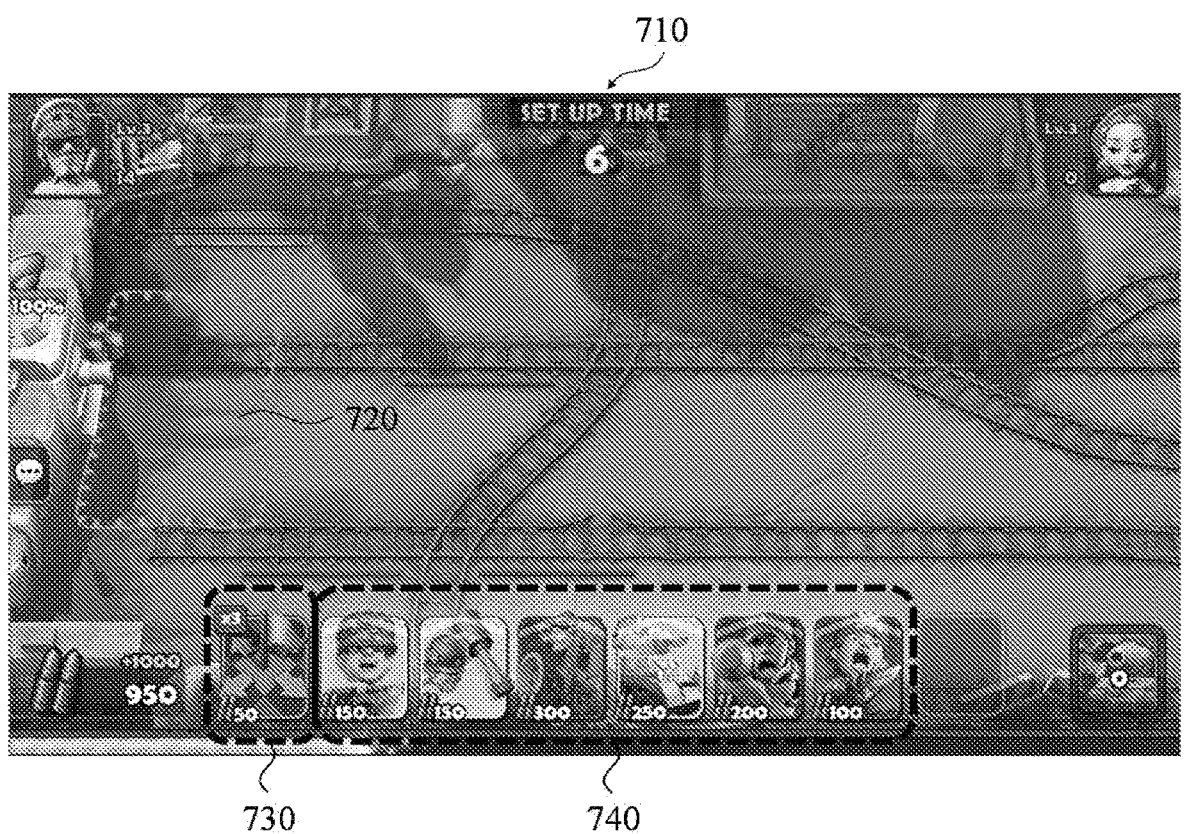
FIGS. 7 through 9 illustrate examples of a game screen according to at least one example embodiment.
Figure 8:
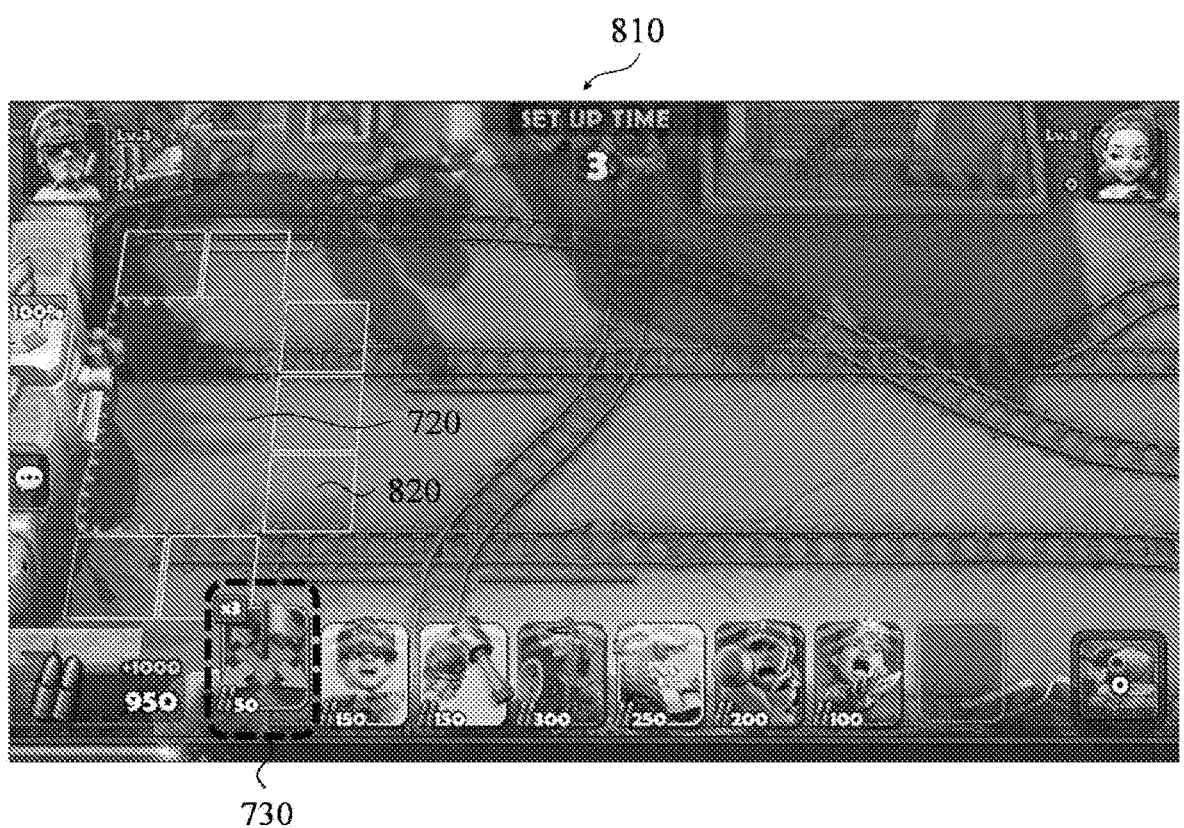
Figure 9:
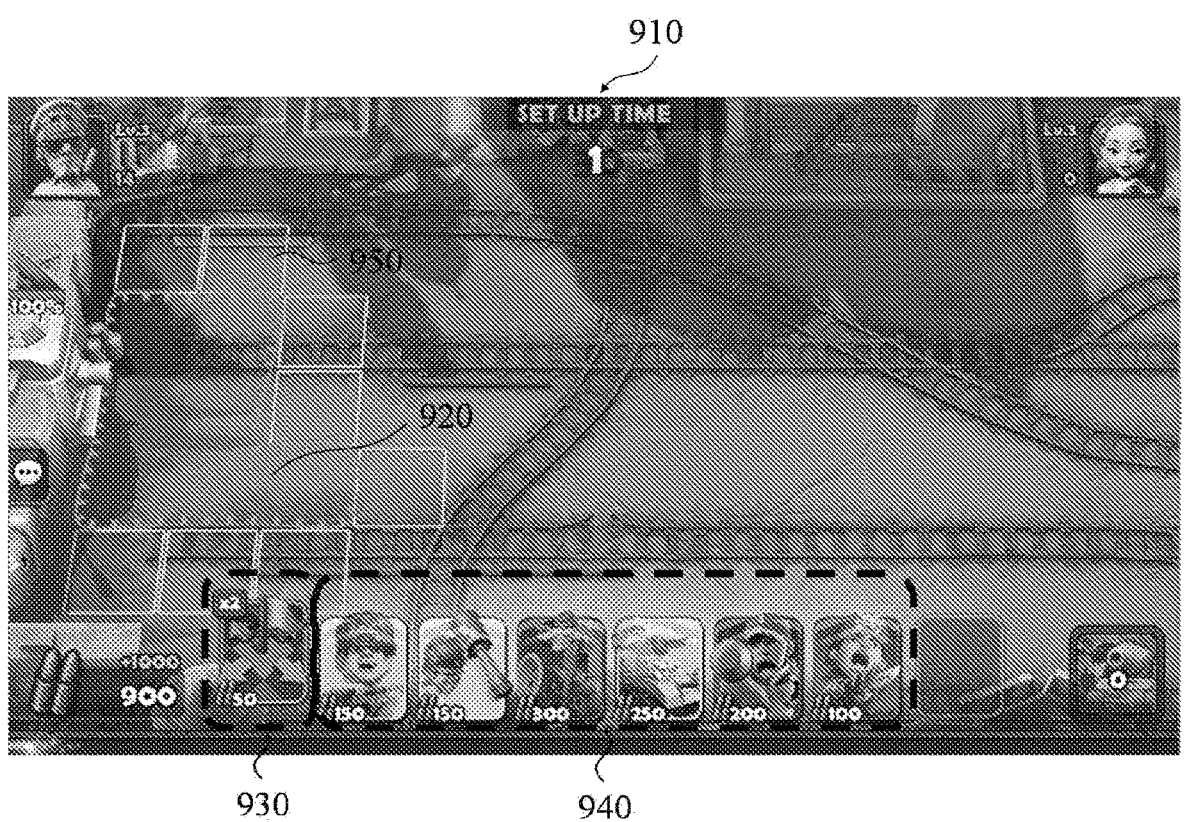

FIGS. 7 through 9 illustrate examples of a game screen according to at least one example embodiment.

FIG. 7 illustrates an example of a first game screen 710 implemented from perspective of a first user and also illustrates an example of a unit placement space 720 of the first user. A first box 730 indicated with a dotted line on the first game screen 710 refers to a user interface for activating a space expansion function. When the first user touches an area on which the user interface for activating the space expansion function with a finger in a touchscreen environment, the space expansion function may be activated. A second box 740 indicated with a dotted line on the first game screen 710 refers to an example of a unit purchase function. The first user may select the user interface displayed through the second box 740, and may purchase a specific unit from among various units through the selected user interface. The purchased unit may be placed on a unit space selected by the user from among unit spaces included in the unit placement space 720.

FIG. 8 illustrates an example of a second game screen 810 implemented from perspective of the first user, and also illustrates an example of displaying expandable unit spaces for the user in response to the first user selecting the user interface for activating the space expansion function displayed through the first box 730. Referring to FIG. 8, the expandable unit spaces are limited to unit spaces adjacent to the unit placement space 720 of the first user. Here, the first user may select a single unit space from among the displayed unit spaces, and may purchase the selected unit space. For example, the first user may select a specific unit space 820.

FIG. 9 illustrates an example of a third game screen 910 implemented from perspective of the first user. Here, the third game screen 910 refers to a unit placement space 920 of the first user in which the specific unit space 820 is purchased and added to the initial unit placement space 720 in response to the first user selecting the specific unit space

820 from among the unit spaces displayed on the second game screen 810 of FIG. 8. That is, referring to FIG. 9, an unit placement space 720 initially allocated to the first user is expanded by a unit 820 purchased by the first user.

In the meantime, a number of unit spaces expandable by the user may be limited based on resources. Depending on example embodiments, the number of expandable unit spaces may be additionally limited based on a desired (or alternatively, preset) value. For example, referring to the first box 730 of FIGS. 7 and 8, '×3' represents that the first user may purchase three unit spaces. Here, referring to a third box 930 indicated with a dotted line in FIG. 9, since the first user has purchased a single unit space, a number of unit spaces additionally purchasable by the first user is reduced to two (e.g., '×2').

On the third game screen 910, the first user may purchase a desired unit through a unit purchase function provided through a second box 940 indicated with a dotted line, and may place the purchased unit through the expanded unit placement space 920. Here, the unit space newly included in the unit placement space 920 may provide an effect of reducing a distance between the placed unit and a camp of a corresponding opponent. If the first user purchases another unit space 950 displayed on the third game screen 910, an effect of extending a width for placing units may be achieved. As described above, the expansion of the unit placement space 920 may enable units to be more strategically deployed, and thus may provide a strategic advantage during the game.)

The computer apparatus 200 may set an amount of resources desired for purchase to be different with respect to at least two of the plurality of unit spaces. For example, the computer apparatus 200 may set an amount of resources desired to purchase the plurality of unit spaces based on a distance from a headquarter allocated to the user or a distance from the unit placement space of the user in a game instance. Here, the computer apparatus 200 may set an amount of resources per unit space so that an amount of resources desired to purchase a corresponding space may increase according to an increase in the distance.

FIG. 10 illustrates an example of unit spaces to which different prices are set according to at least one example embodiment. Similar to FIG. 6, FIG. 10 illustrates an example in which a field of a game instance is divided into 100 unit spaces through a grid shape 1010 with a size of 5×20. Here, headquarters (HQs) 1020 and 1030 may be allocated to a first user and a second user, respectively. Here, an amount of resources desired for purchase may be set for each of unit spaces based on a distance from each of the HQs 1020 and 1030. Referring to FIG. 10, an amount of resources '0' may be set to unit spaces of a unit placement space initially allocated to each of the first user and the second user, and indicates that the unit spaces are provided without a separate purchase. Further, an amount of resources desired for purchase is set for each of the unit spaces so that an amount of desired resources may increase based on the distance from the HR 1020 or 1030 or a distance from the unit placement space. An amount of resources desired for purchase may vary per unit space. However, placement types of unit spaces or amounts of desired resources according to example embodiments are not limited thereto.

Figure 11:
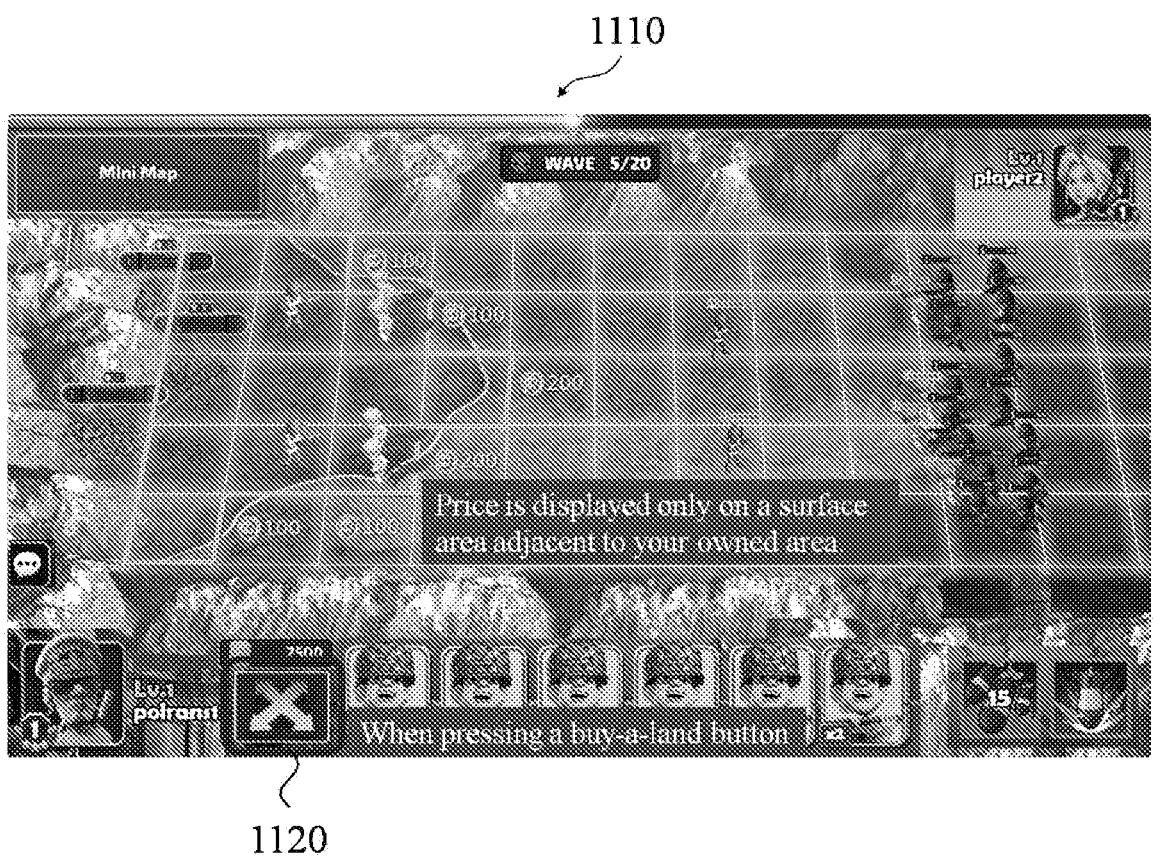
FIG. 11 illustrates an example of a game screen on which an amount of resources desired for each purchasable unit space is displayed according to at least one example embodiment.

FIG. 11 illustrates an example of a game screen on which an amount of resources desired for each purchasable unit space is displayed according to at least one example embodiment. Referring to FIG. 11, with respect to unit spaces adjacent to a unit placement space allocated to a user, an amount of resources desired to purchase a corresponding unit space is graphically displayed on a game screen 1110. Here, graphically displaying an amount of resources may be performed in response to the user selecting a user interface for activating a space expansion function, for example, a button displayed through a box 1120.

Each unit space may be a basic placement unit and may have the following unique attributes.

1. Price:

The attribute "price" may indicate an amount of resources desired for purchase, which is described above. FIG. 10 illustrates an example in which the price of unit spaces is classified into five categories including '0', '1', '2', '3', and '4'. An earning rate may be set to increase according to an increase in the price. The earning rate is described below.

2. Earning Rate:

The attribute "earning rate" may indicate a rate of resource earnings that a unit space allocated to the user may make for the user. For example, in a turn-based game, each unit space may provide an amount of resources corresponding to the earning rate to the user that owns the corresponding unit space as earnings.

3. Gimmick:

The attribute "gimmick" may indicate an item that is set to at least a portion of a plurality of unit spaces constituting a field. The item may give a specific effect to a game instance. The effect may be applied to at least one of a unit space in which the item is set, a unit of the user, or a unit of a counterpart (e.g., an opponent) in response to the user purchasing a corresponding unit space. The unit in which the item is set may be set not to trigger earnings.

4. Team:

The attribute "team" may indicate that a corresponding unit space is owned by the user purchasing the unit space, and the user may place the unit on the unit space owned by the user. Ownership of the unit space may not be changed.

Figure 12:
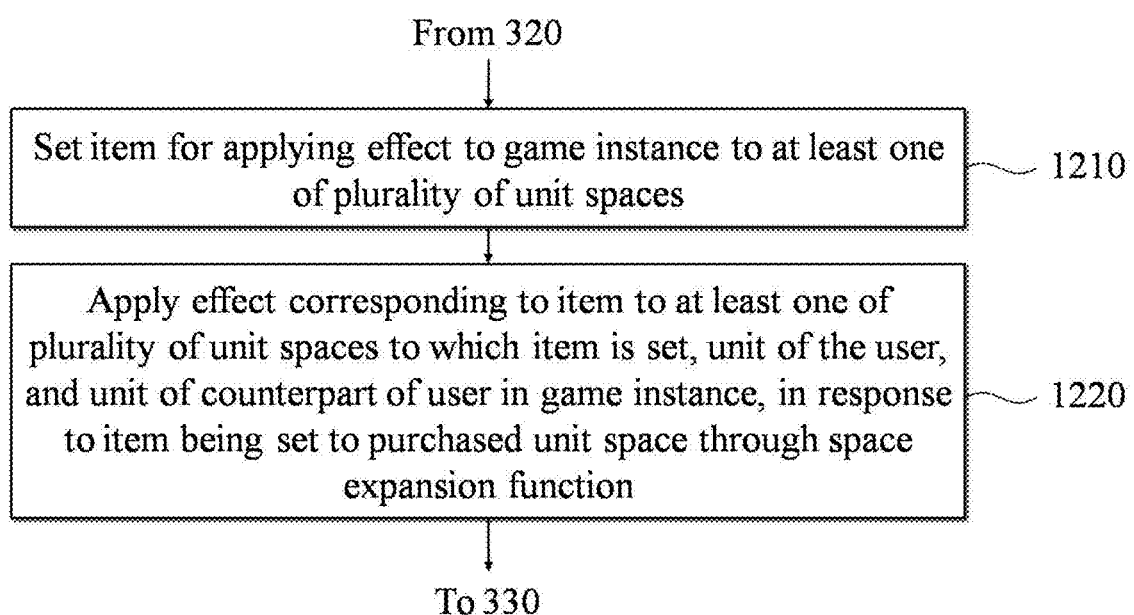
FIG. 12 is a flowchart illustrating an example of a process of providing an item according to at least one example embodiment.

FIG. 12 is a flowchart illustrating an example of a process of providing an item according to at least one example embodiment. Operations 1210 and 1220 may be performed by the computer apparatus 200 between operations 320 and 330 of FIG. 3.

Referring to FIG. 12, in operation 1210, the computer apparatus 200 may set an item (alternatively, referred to as "game item") for applying an effect to the game instance to at least one of the plurality of unit spaces. For example, the computer apparatus 200 may change a level of the effect corresponding to the item based on a distance between a unit space to which the item is set and a headquarter allocated to the user in the game instance or a distance between the unit space to which the item is set and the unit placement space. For example, although they are the same type of items, a level of an effect corresponding to an item set to a unit space may be set to increase as a distance from the headquarter or the unit placement space increases. As another example, the computer apparatus 200 may dynamically change at least one of a type of an item, a number of times, or a location at which the item is placed based on an intermediate result according to the progress of the game instance. For example, when the second user is determined to be losing in a game instance in which a combat is ongoing between the first user and the second user, a location of an item may be dynamically adjusted to be placed closer to the unit placement space of the second user. As another example, when a number of offensive items is set to be greater than a number of obstacle items, users may be induced to play a game using a relatively large amount of units. When the number of obstacle items is set to be greater than the number of offensive items, the users may be induced to play a game at a relatively slow tempo.

As another example, when items are intensively placed at rear of a corresponding user (e.g., on unit spaces close to the unit placement space of the user), the user may perform a stable defense. When a gimmick placement is concentrated in front (e.g., in a middle portion of the field), a fast combat may be induced. As another example, items may be set by designating a plurality of presets in each of which items are preset in a portion of unit spaces, and by randomly selecting and using a single preset from among the plurality of presets when the game instance starts.

In operation 1220, the computer apparatus 200 may apply the effect corresponding to the item to at least one of the plurality of unit spaces to which the item is set, the unit of the user, or the unit of the counterpart (e.g., an opponent) of the user in the game instance, in response to the item being set to the purchased unit space through the space expansion function. The applied effect may affect the progress of the game instance in operation 330 of FIG. 3.

For example, an item may be classified into an offensive item or an obstacle item. Such items may operate in such a manner that an offensive unit or an obstacle unit corresponding to an item is placed on a corresponding unit space. Depending on example embodiments, buff/de-buff items for applying a specific effect to a specific unit or the entire units of the user or a specific unit or entire units of the counterpart may be used.

A scenario of using a minefield as an offensive item may be considered. For example, a minefield may be an item of changing a corresponding unit space as a minefield. When a unit of the counterpart (e.g., the opponent) is present in the corresponding unit space, a mine may explode to damage the unit of the counterpart, and may be set to be invisible on a side of the counterpart until an initial explosion occurs. A level of damage may be set to increase as the corresponding unit space is closer to a center. Here, being closer to a center may indicate that the corresponding unit space is away from the aforementioned headquarter or unit placement space. Once the explosion occurs, the minefield may be inactivated. Units capable of reactivating the inactivated minefield may be applied. For example, when a friendly engineering unit is placed on the inactivated minefield, the inactivated minefield may be reactivated. Here, for reactivation of the minefield, the friendly engineering unit may stand by in a stationary state on the corresponding unit space during a desired (or alternatively, preset) period of time (e.g., 5 seconds). Once the reactivation is completed or canceled, the friendly engineering unit may move back in an original progress direction or may attack an attackable unit of the counterpart nearby.

Also, a scenario of placing a specific unit on a unit space in which an offensive item is set as an offensive item may be considered. For example, a single unit may be randomly selected from a specific unit set, and may be placed on the corresponding unit space. Depending on example embodiments, the closer a location of the corresponding unit space is to a center, the more powerful unit may be selected.

As an obstacle item, a barricade or a trap for reducing a moving speed of a unit of the counterpart (e.g., the opponent) or stopping the unit thereof during a desired (or alternatively, preset) period of time may be considered. Also, natural obstacles, for example, wetland, snowfield, and/or swamp), which affect a friendly unit and the unit of the counterpart may be considered.

Types of items may be variously set and used. For example, the types of items may include an item that may increase a maximum number of placeable units, an item associated with curing a damaged unit, and an item of acquiring or triggering a special skill available in the game instance.

Figure 13:
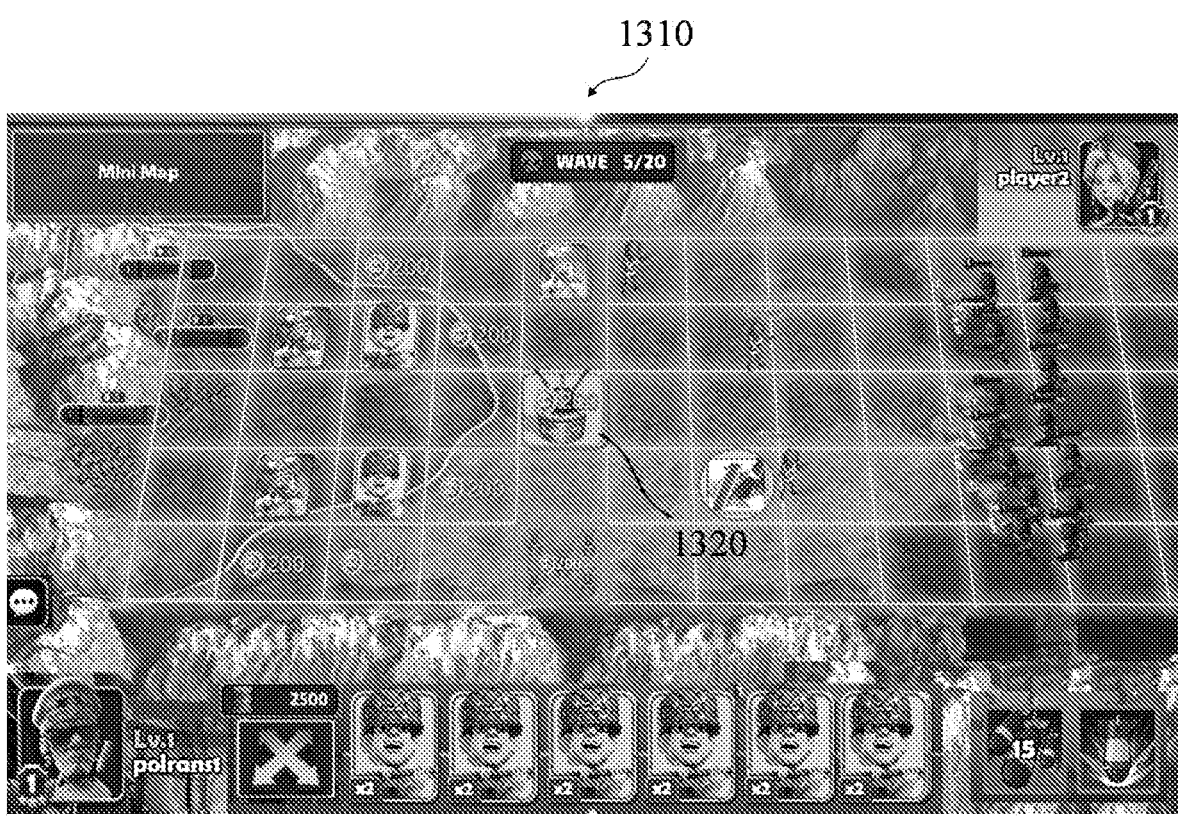
FIG. 13 illustrates an example of a screen on which an item set to a unit space is displayed according to at least one example embodiment.

FIG. 13 illustrates an example of a screen on which an item set to a unit space is displayed according to at least one example embodiment. A game screen 1310 of FIG. 13 relates to an example of providing information about items set to a space in response to a user activating a space expansion function to expand a unit placement space. For example, when the user purchases a unit space 1320 to which a mine picture is set, a minefield may be activated on the unit space 1320.

According to some example embodiments, it is possible to provide a user with a function capable of arbitrarily expanding a limited space in which units are placeable in a game using resources provided from the game, to allow users to place a unit through a secured space only when a unit placement space is secured in advance and thereby, to induce the users to expand a space for strategically placing units and to provide a strategic advantage in the game.

The systems and or apparatuses described herein may be implemented using hardware components, software components, and/or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular, however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape, optical media such as CD ROM disks and DVD, magneto-optical media such as floptical disks, and hardware devices that are configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of expanding a unit placement space, the method comprising:
   allocating at least one of a plurality of unit spaces constituting a field of a game instance to a user as the unit placement space in response to initiating the game instance in a game;
   providing the user with a space expansion function of expanding the unit placement space by purchasing a unit space using resources allocated to the user in the game or in the game instance during a progress of the game instance;
   identifying a game item for applying an effect to the game instance deployed on at least a portion of the expanded unit placement space;
   proceeding with the game instance (i) based on a unit of the user included in the unit placement space, and (ii) in response to expanding the unit placement space using the space expansion function, based on a unit of the user included in the expanded unit placement space;
   deploying the game item for applying the effect to the game instance on at least one of the plurality of unit spaces not yet purchased through the space expansion function; and
   in response to the at least one of the plurality of unit spaces being purchased through the space expansion function and becoming part of the expanded unit placement space, applying the effect corresponding to the game item to at least one of
      i) the expanded unit placement space on which the game item is deployed,
      ii) the unit of the user, or
      iii) a unit of a counterpart of the user in the game instance.

2. The method of claim 1, wherein a unit space purchasable through the space expansion function is limited to a unit space adjacent to the unit placement space allocated to the user.

3. The method of claim 1, wherein
   the field is divided into the plurality of unit spaces by a plurality of cells in a grid shape, and
   the method further comprises,
      graphically displaying the plurality of cells in the grid shape on the field in response to the user activating the space expansion function,
      purchasing, using the resources, a unit space corresponding to a cell, from among the plurality of cells, adjacent to the unit placement space allocated to the user, and
      expanding the unit placement space by adding the purchased unit space to the unit placement space.

4. The method of claim 1, further comprising:
   providing the user with a unit purchase function of purchasing a unit using the resources, in the game instance; and
   placing a unit purchased through the unit purchase function on a unit space selected by the user from among the plurality of unit spaces included in the unit placement space or the expanded unit placement space.

5. The method of claim 1, further comprising:
   setting an amount of the resources for purchase to be different with respect to each of at least two of the plurality of unit spaces.

6. The method of claim 1, further comprising:
   setting an amount of the resources to purchase each of the plurality of unit spaces based on a distance from a headquarter allocated to the user or a distance from the unit placement space in the game instance.

7. The method of claim 1, wherein the deploying the game item comprises changing a level of the effect corresponding to the game item based on (i) a distance between the unit space to which the game item is deployed and a headquarter allocated to the user in the game instance or (ii) a distance between the unit space to which the game item is deployed and the unit placement space.

8. The method of claim 1, wherein the deploying the game item comprises dynamically changing at least one of a type of the game item, a number of game items, or a location at which the game item is deployed based on an intermediate result according to the progress of the game instance.

9. The method of claim 1, wherein the proceeding includes:
   proceeding with the game instance based on a plurality of turns, and
   providing an amount of the resources for each unit space included in the unit placement space of the user per new turn.

10. A non-transitory computer-readable recording medium storing instructions that, when executed by a processor, cause the processor to perform the method of claim 1.

11. A computer apparatus comprising:
   at least one processor configured to execute computer-readable instructions, the at least one processor is configured to,
   allocate at least one of a plurality of unit spaces constituting a field of a game instance to a user as a unit placement space in response to initiating the game instance in a game,
   provide the user with a space expansion function of expanding the unit placement space by purchasing a unit space using resources allocated to the user in the game or in the game instance during a progress of the game instance,
   identify a game item for applying an effect to the game instance deployed on at least a portion of the expanded unit placement space; and
   proceed with the game instance (i) based on a unit of the user included in the unit placement space, and (ii) in response to expanding the unit placement space using the space expansion function, based on a unit of the user included in the expanded unit placement space, wherein the at least one processor is configured to deploy the game item to the at least a portion of the expanded unit placement space by,
deploying the game item for applying the effect to the game instance on at least one of the plurality of unit spaces not yet purchased through the space expansion function, and
in response to the at least one of the plurality of unit spaces being purchased through the space expansion function and becoming part of the expanded unit placement space, applying the effect corresponding to the game item to at least one of
  i) the expanded unit placement space on which the game item is deployed,
  ii) the unit of the user, or
  iii) a unit of a counterpart of the user in the game instance.

12. The computer apparatus of claim 11, wherein the at least one processor is configured to limit a unit space purchasable through the space expansion function to a unit space adjacent to the unit placement space allocated to the user.

13. The computer apparatus of claim 11, wherein
the field is divided into the plurality of unit spaces by a plurality of cells in a grid shape, and
the at least one processor is configured to,
  graphically display the plurality of cells in the grid shape on the field in response to the user activating the space expansion function,
  purchase, through the resources, a unit space corresponding to a cell from among cells adjacent to the unit placement space allocated to the user, and
  expand the unit placement space by adding the purchased unit space to the unit placement space.

14. The computer apparatus of claim 11, wherein the at least one processor is configured to
provide the user with a unit purchase function of purchasing a unit using the resources, in the game instance, and
place a unit purchased through the unit purchase function on a unit space selected by the user from among a plurality of unit spaces included in the unit placement space or the expanded unit placement space.

15. The computer apparatus of claim 11, wherein the at least one processor is configured to
set an amount of the resources for purchase to be different with respect to at least two of the plurality of unit spaces.

16. The computer apparatus of claim 11, wherein the at least one processor is configured to
set an amount of the resources to purchase each of the plurality of unit spaces based on a distance from a headquarter allocated to the user or a distance from the unit placement space in the game instance.

17. The computer apparatus of claim 11, wherein
the at least one processor is configured to proceed with the game instance based on a plurality of turns, and
provide an amount of the resources for each unit space included in the unit placement space per new turn.

18. The method of claim 1, further comprising:
providing a user interface for activating the space expansion function.

* * * * *